United States Patent
Hu et al.

(10) Patent No.: US 8,104,821 B2
(45) Date of Patent: Jan. 31, 2012

(54) NEW-STYLE TONNEAU COVER

(75) Inventors: Yachun Hu, Shanghai (CN); Shaobo Hu, Shanghai (CN)

(73) Assignee: Jiuda Vehicle Fittingsmaking (Shanghai) Co., Ltd, Shanghai (CN)

( * ) Notice: Subject to any disclaimer, the term of this patent is extended or adjusted under 35 U.S.C. 154(b) by 0 days.

(21) Appl. No.: 12/924,254

(22) Filed: Sep. 23, 2010

(65) Prior Publication Data

US 2011/0148137 A1 Jun. 23, 2011

(30) Foreign Application Priority Data

Sep. 24, 2009 (CN) .................... 2009 2 0311242 U

(51) Int. Cl.
*B60P 7/02* (2006.01)
(52) U.S. Cl. ............... 296/100.17; 296/100.01
(58) Field of Classification Search .......... 296/100.01, 296/100.02, 100.17, 101
See application file for complete search history.

(56) References Cited

U.S. PATENT DOCUMENTS

| | | | | |
|---|---|---|---|---|
| 5,743,586 | A * | 4/1998 | Nett | 296/100.02 |
| 6,113,176 | A * | 9/2000 | Bernardo | 296/100.01 |
| 6,331,028 | B1 * | 12/2001 | O'Neill et al. | 296/100.01 |
| 7,318,618 | B1 * | 1/2008 | Yue | 296/100.06 |
| 7,878,572 | B2 * | 2/2011 | Hu et al. | 296/100.02 |
| 2003/0168878 | A1 * | 9/2003 | Myers | 296/100.02 |
| 2004/0164578 | A1 * | 8/2004 | Mack et al. | 296/26.04 |
| 2007/0035151 | A1 * | 2/2007 | Rusu | 296/100.01 |

* cited by examiner

*Primary Examiner* — Lori Lyjak
(74) *Attorney, Agent, or Firm* — Law Offices of John A. Parrish

(57) ABSTRACT

The invention provides a new-style tonneau cover, wherein comprises a cover plate body matching the rear truck bed. The cover plate body is a three-layer structure, comprising an outer layer, an intermediate layer and an inner layer from the exterior to the interior. The outer layer is made of polyurethane foam mixed with glass fiber; the intermediate layer is made of polyurethane foam and the inner layer is made of resin; the density of polyurethane foam in the intermediate layer is lower than that in the outer layer; polyurethane foam is light in weight and high in specific strength. In this invention, the cover plate body is made of three different layers so that the cover is light in weight and high in strength, taking up less room of the rear truck bed, better for free opening and closing operation.

12 Claims, 5 Drawing Sheets

NEW-STYLE TONNEAU COVER

FIELD OF INVENTION

This invention belongs to the field of automobile parts and concerns a movable cover installed on the notchback (pickup) for covering and closing the rear truck bed. The invention relates to a new-style tonneau cover.

BACKGROUND OF INVENTION

The common notchbacks have open rear truck bed which offers a poor protection for goods during transportation. People therefore install a movable cover to cover and close the rear truck bed and remove the cover only when goods are comparatively high. Existing covers made of glass fiber reinforced plastic (resin) or thermoplastic plastics are very inconvenient for use due to the following reasons: the cover made of glass fiber reinforced plastic (resin) must have a certain thickness to ensure sufficient strength. If the cover is too thick and heavy, it will affect its opening/closing flexibility and oil consumption for the vehicle, as well as have a high requirement for the actuating mechanism. The cover made of thermoplastic plastic is a hollow structure and quite thick, occupying too much room of the rear truck bed with its appearance hardly matching that of the vehicle body.

SUMMARY OF INVENTION

This invention provides a new-style tonneau cover, light in weight, high in strength and good in appearance, which takes up less room of the rear truck bed, better for free opening and closing operation.

In order to achieve the above objective, the technical solution of the invention is as follows:

It relates to a new-style tonneau cover which includes a cover plate body matching the rear truck bed. The cover plate body is a three-layer structure, comprising an outer layer, an intermediate layer and an inner layer from the exterior to the interior. The outer layer is made of polyurethane foam mixed with glass fiber; the intermediate layer is made of polyurethane foam and the inner layer is made of resin material. Polyurethane foam is light in weight and high in specific strength. Polyurethane foam mixed with glass fiber in the outer layer further improves mechanical strength.

The density of polyurethane foam in the outer layer of the cover plate is higher than that in the intermediate layer. Higher density in the outer layer ensures the strength of the cover plate body while lower density in the intermediate layer reduces the whole weight of the cover plate body.

The content of glass fiber in the intermediate layer is lower than that in the outer layer. The content of glass fiber in the intermediate layer can be zero to the lowest. Such difference in the content of glass fiber gets the strength of the outer layer to be far higher than that of the intermediate layer, thereby the outer layer offering sufficient strength and support and the intermediate layer reducing the weight.

A quadrangle hollow framework is provided in the outer layer matching the periphery of the rear truck bed, to increase strength at the contact position between the cover plate body and the rear truck bed.

The framework is composed of hollow tubes, which ensure the supporting strength of the framework and make the cover plate body much lighter by further reducing weight of framework, thereby improving opening/closing flexibility for the cover plate.

The position where the framework is inserted in the outer layer is thickened to form a reinforced rib so as to facilitate its insertion and improve strength at that position.

The outer layer comprises of an aduncal curling by the outside of the framework, which can shield the edge of the rear truck bed, to prevent water, rain and dust from entering.

The outer layer is covered by dense layer formed through resin treatment, thereby improving the surface strength and flatness of the cover plate body and eliminating adverse impact brought about by microcellular polyurethane foam.

The dense layer is covered with a coating layer, thereby preventing the outer surface of the cover plate body from being directly affected by adverse external conditions and also making the cover more beautiful.

The inner layer is covered with a flexible buffer layer, thereby preventing the cover plate body and goods from damage due to collision when the cover is opened or closed.

The surface of the flexible buffer layer is stuck by the sealing strip corresponding to the periphery of the rear truck bed, which can strengthen sealing at the contact surface between the cover plate body and the rear truck bed, improve the function of rain prevention and also play the role of buffering and damping when the cover is closed.

The sealing strip is provided with an aduncal curling at both sides, which can improve sealing between the sealing strip and the rear truck bed and enhance water and dust prevention.

Compared with current tonneau covers, the invention offers the following advantages: compact in shape, light in weight, flexible opening and closing (convenient operation), taking up less room of the rear truck bed; good appearance matching the vehicle body and economical production cost.

DETAILED DESCRIPTION OF EMBODIMENTS

In combination with the description of the drawings, the embodiment of the invention will now be described in detail.

Figure 1:
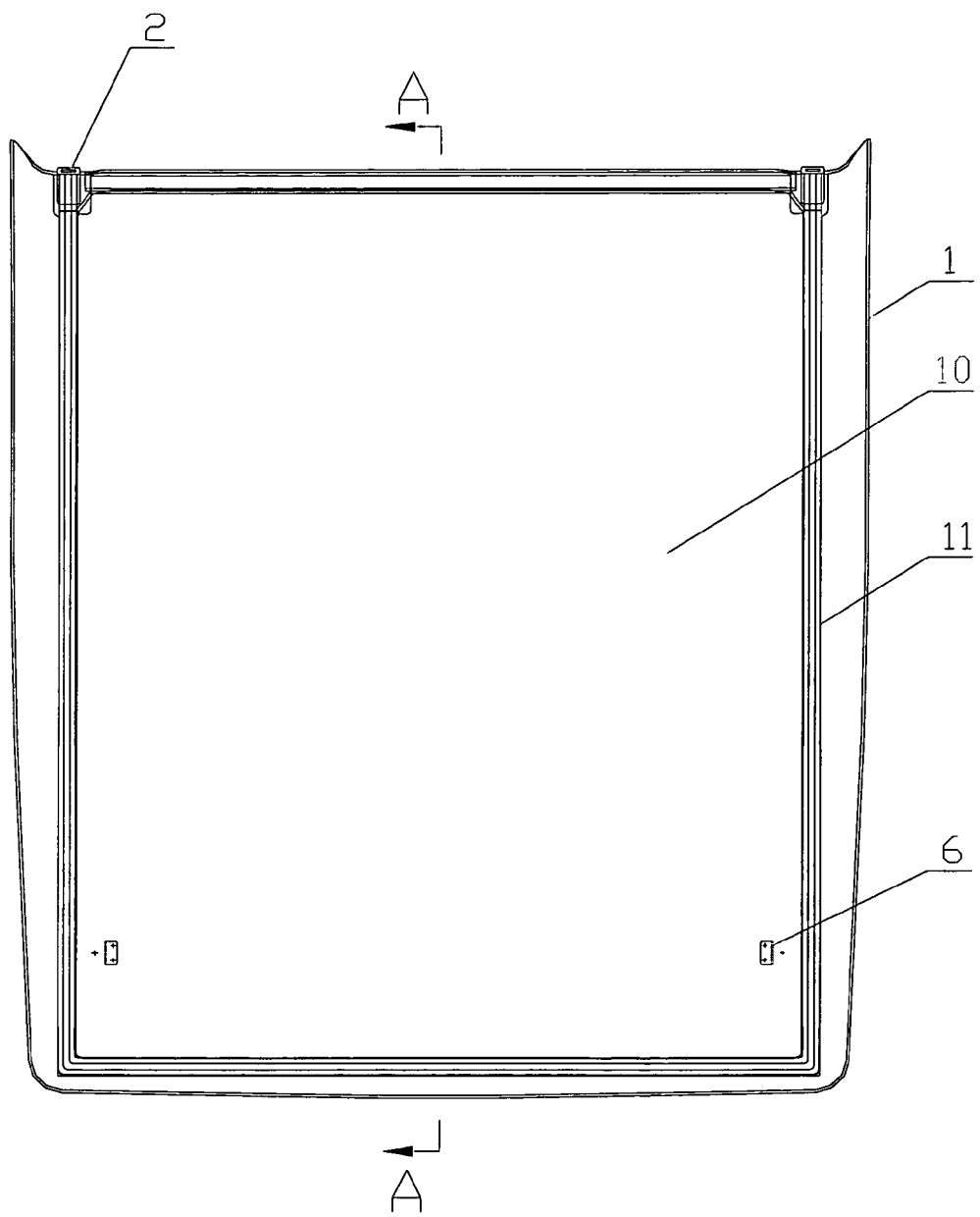
FIG. 1 is a bottom view of the new-style tonneau cover in this invention.
Figure 5:
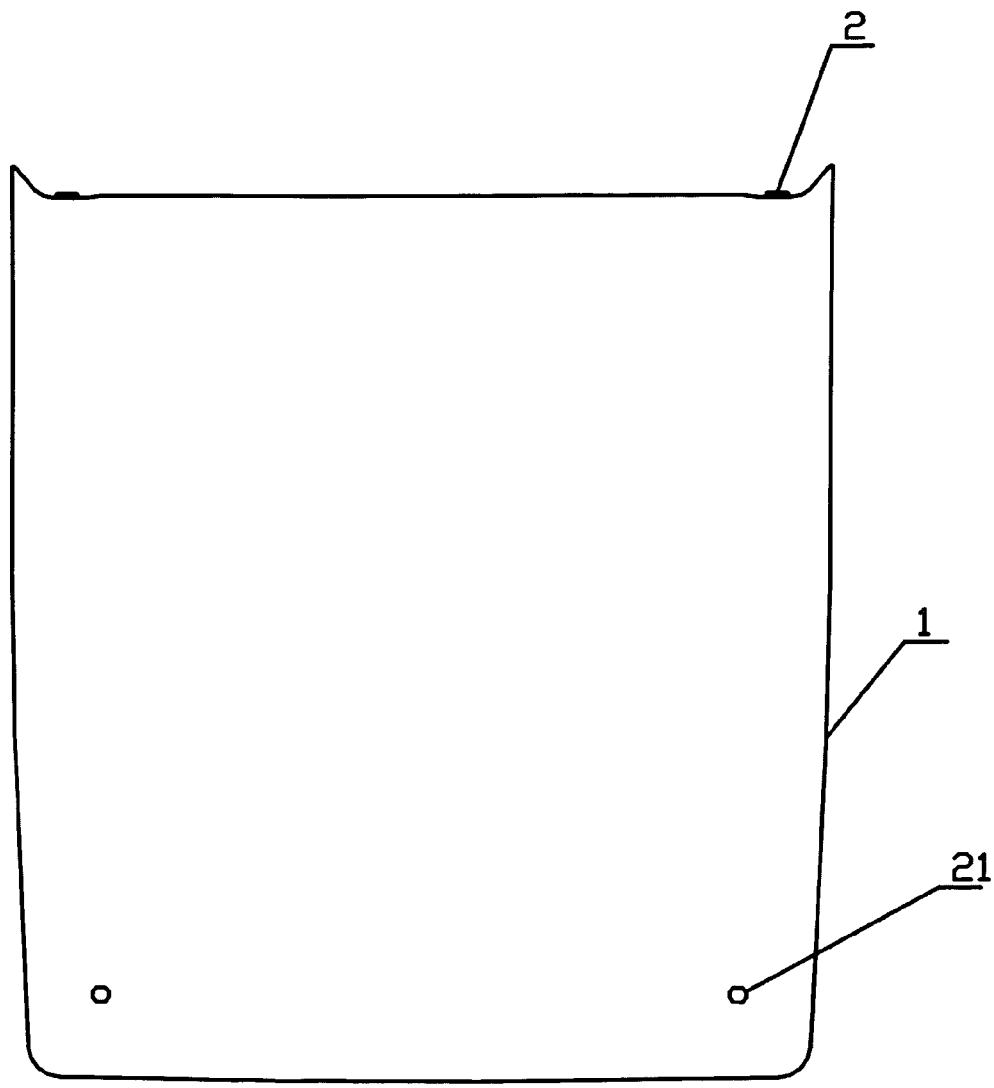
FIG. 5 is a vertical view of the new-style tonneau cover in this invention.

As shown in FIGS. 1 and 5, the new-style tonneau cover of the invention includes a cover plate body 1 matching the rear truck bed. On the outer layer of the cover plate body 1, two rotary hinges 2 are installed symmetrically adjacent to the vehicle head and two strut connecting pieces 6 (for opening and closing the cover) are installed symmetrically adjacent to the vehicle tail. Two leaves of the rotary hinge 2 are respectively fixed to the rear truck bed and the cover plate body 1 to allow free opening and closing of the cover plate body 1. The strut connecting piece 6 connects to one end of the strut; the other end of the strut connects and fixes to the rear truck bed. The rotary hinges 2 and the strut connecting pieces 6 implement to open and close the cover plate body 1 on the rear truck bed. As shown in FIG. 5, two carriage locks 21 have been installed symmetrically at both sides of the cover plate body 1 near the vehicle tail, which locks the cover 1 to the carriage when the cover 1 is closed.

Figure 2:
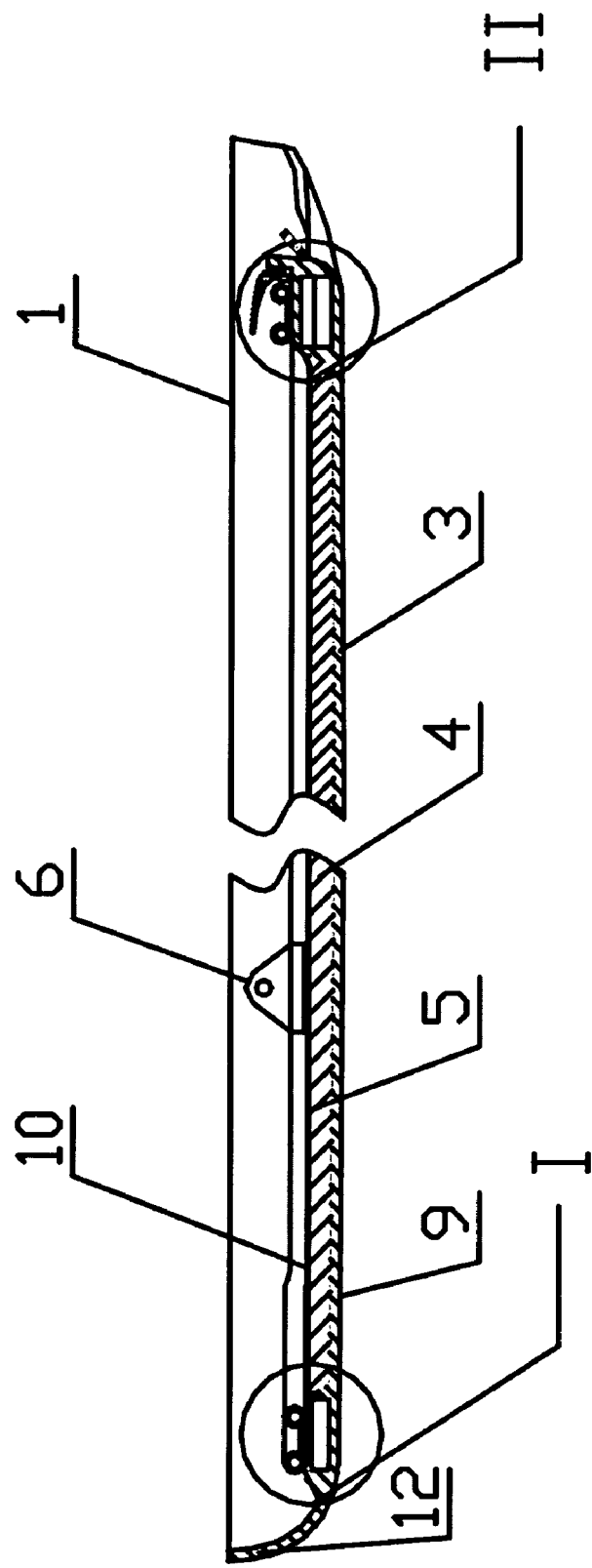
FIG. 2 is an A-A sectional view of the new-style tonneau cover in this invention.

As shown in FIG. 2, the cover plate body 1 is a three-layer structure, comprising an outer layer 3, an intermediate layer 4 and an inner layer 5 from the exterior to the interior. The outer layer 3 is made of polyurethane foam mixed with glass fiber. The intermediate layer 4 is made of polyurethane foam and the inner layer 5 is made of fiber reinforced unsaturated resin or other resin material. Polyurethane foam is light in weight and high in specific strength. Polyurethane foam mixed with glass fiber in the outer layer 3 further improves mechanical strength.

The density of polyurethane foam in the outer layer 3 of the cover plate is higher than that in the intermediate layer 4. Higher density in the outer layer 3 ensures the strength of the cover plate body 1 while lower density in the intermediate layer 4 reduces the whole weight of the cover plate body 1.

The content of glass fiber in the intermediate layer 4 is lower than that in the outer layer 3. Such difference in the content of glass fiber allows the strength of the outer layer 3 to be far higher than that of the intermediate layer 4, thereby the outer layer 3 offering sufficient strength and support and the intermediate layer 4 reducing the weight.

Figure 3:
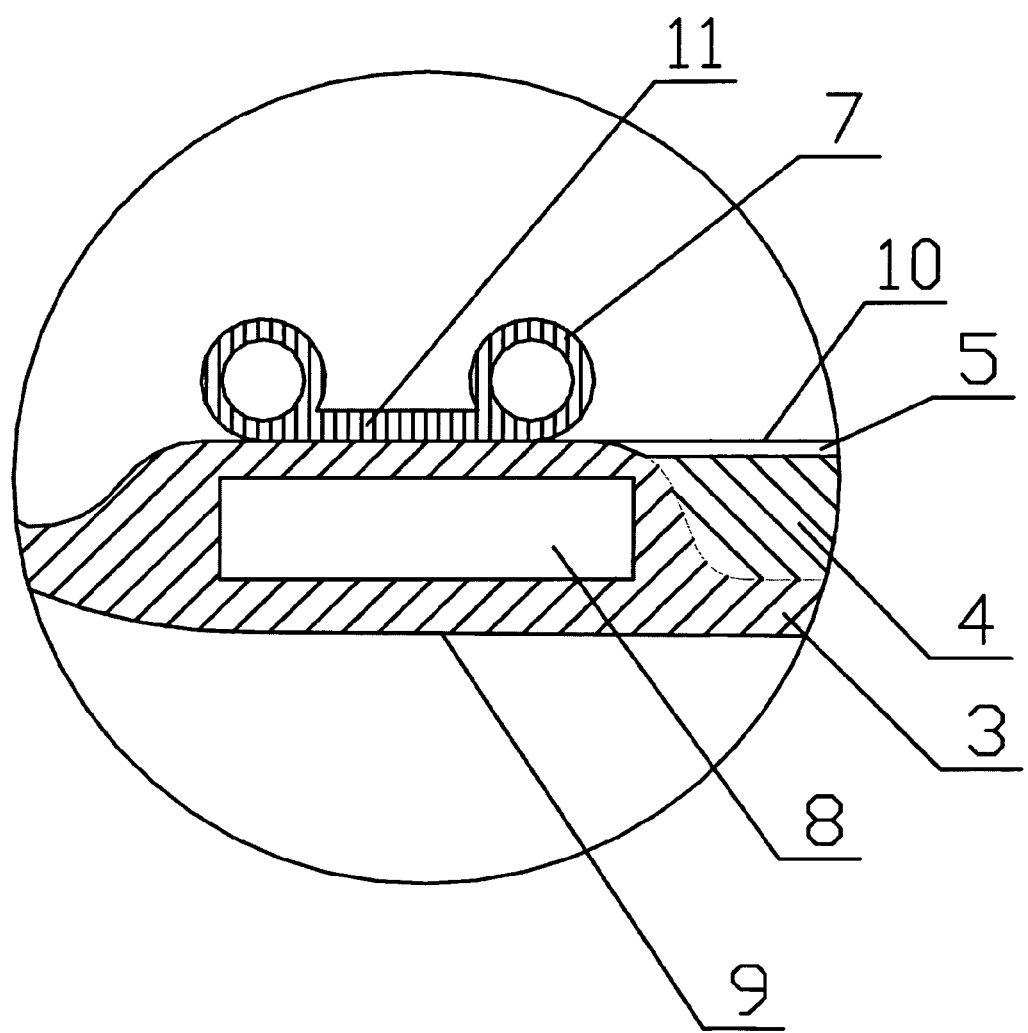
FIG. 3 is an enlarged view of the new-style tonneau cover Part I in this invention.
Figure 4:
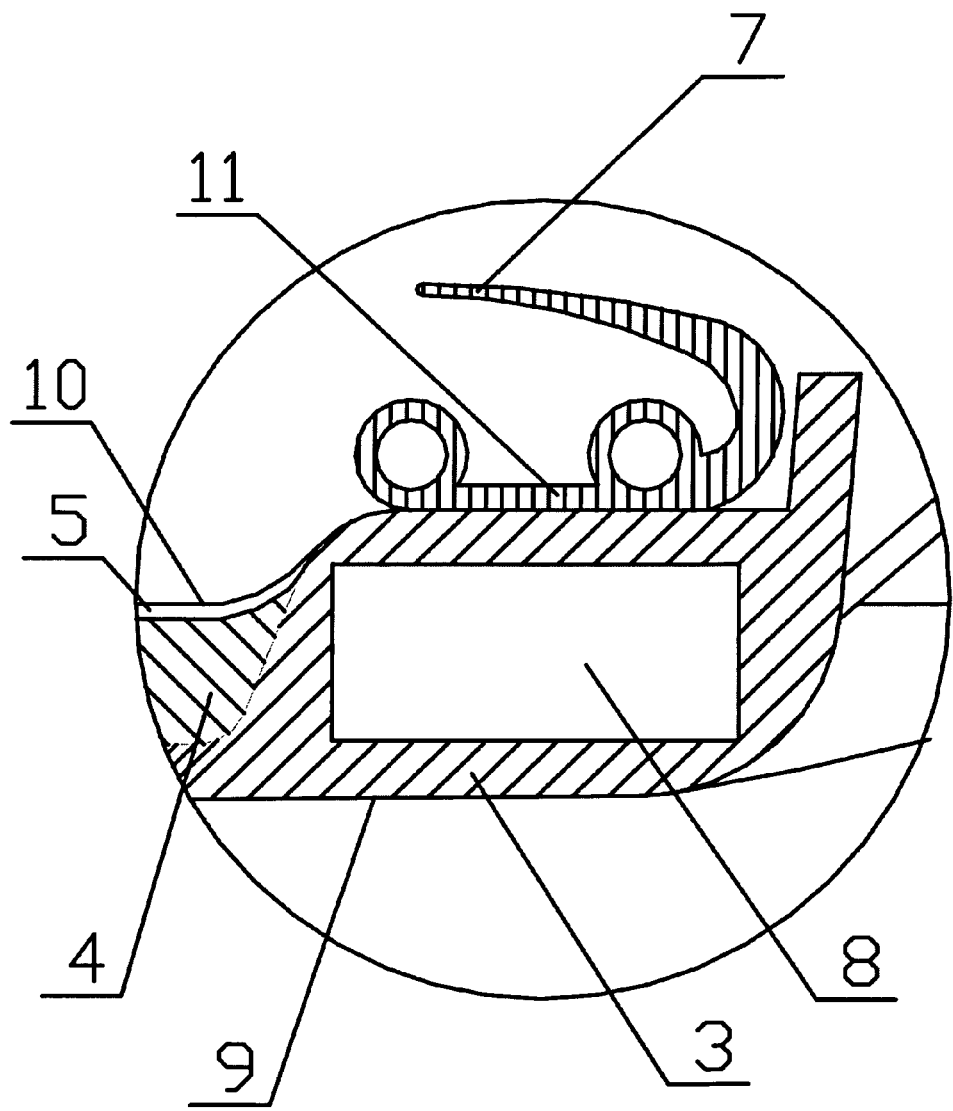
FIG. 4 is an enlarged view of the new-style tonneau cover Part II in this invention.

As shown in FIGS. 3 and 4, a quadrangle hollow framework 8 is provided in the outer layer 3 matching the periphery of the rear truck bed. The position where the framework 8 is inserted in the outer layer 3 is thickened to form a reinforced rib. The outer layer 3 comprises of an aduncal curling by the outside of the framework, which can shield the edge of the rear truck bed, to prevent water, rain and dust from entering.

The framework 8 is composed of hollow tubes, which ensure the supporting strength of the framework 8 and make the cover plate body 1 much lighter by further reducing weight of framework, thereby improving opening/closing flexibility for the cover. The hollow tubes can be made of metal or plastic tubes or battens.

The outer layer 3 is covered by dense layer formed through resin treatment, which is made of unsaturated resin or other equivalent material. The dense layer is covered with a coating layer 9, thereby improving the surface strength and flatness of the cover plate body 1 and eliminating adverse impact brought about by microcellular polyurethane foam. The coating layer 9 can prevent the outer surface of the cover plate body 1 from being directly affected by adverse external conditions and aging. The coating layer 9 can also be in different colors and therefore make the whole vehicle more beautiful.

The inner layer 5 is covered with a flexible buffer layer 10 made of felt or cloth or other equivalent material, thereby preventing the cover plate body 1 and goods from damage due to direct rigid collision when the cover is opened or closed.

The surface of the flexible buffer layer 10 is stuck by the sealing strip 11 corresponding to the periphery of the rear truck bed, which can strengthen sealing at the contact surface between the cover plate body 1 and the rear truck bed, improve the function of rain prevention and also play the role of buffering and damping so as to reduce collision noise when the cover is closed.

The sealing strip 11 is provided with an aduncal curling 7 at both sides, which can improve sealing between the sealing strip 11 and the rear truck bed and enhance water and dust prevention.

Although the contents of the invention have been introduced in detail by means of the above preferred embodiments, it should be realized that the above description is not deemed as a limit to the invention. After technicians in this field read the above contents, it will be obvious to witness several modifications and substitutions of the invention. So the protective scope of the invention will be limited by the attached claims.

The invention claimed is:

1. A tonneau cover comprising a cover plate body (1) for matching a truck bed wherein the cover plate comprises an outer layer (3), an intermediate layer 4 and an inner layer (5) wherein the outer layer (3) comprises polyurethane foam mixed with glass fiber; the intermediate layer (4) comprises polyurethane foam; and the inner layer (5) comprises resin material.

2. The tonneau cover plate of claim 1 wherein the density of polyurethane foam in the outer layer (3) is higher than the density of polyurethane foam in the intermediate layer (4).

3. The tonneau cover plate of claim 2 wherein the content of glass fiber in the intermediate layer (4) is less than the content of glass fiber in the outer layer (3).

4. The tonneau cover plate of claim 1 wherein a quadrangle framework (8) for matching the periphery of the truck bed is positioned in the outer layer (3).

5. The tonneau cover plate of claim 4 wherein the framework comprises hollow tubes.

6. The tonneau cover plate of claim 5 wherein the framework positioned in the outer layer (3) to forms a reinforced rib.

7. The tonneau cover plate of claim 1 wherein an aduncal curling is provided on the outer layer (3).

8. The tonneau cover plate of claim 1 wherein the outer layer (3) is covered with a dense layer formed by resin.

9. The tonneau cover plate of claim 8 wherein the dense layer is covered with a coating layer (9).

10. The tonneau cover plate of claim 1 wherein the inner layer is covered with a flexible buffer layer (10).

11. The tonneau cover plate of claim 10 wherein the surface of the flexible buffer layer (10) bears a sealing strip (11) corresponding to the periphery of the truck bed.

12. The tonneau cover plate of claim 11 wherein the sealing strip 11 is provided with an aduncal curling (7) at a side of the strip (11).

* * * * *